Oct. 22, 1968 H. KORETZKY 3,407,126

ELECTRODEPOSITION OF MAGNETIC THIN FILMS

Filed Dec. 23, 1965

INVENTOR
HERMAN KORETZKY

BY [signature]

ATTORNEY

United States Patent Office 3,407,126
Patented Oct. 22, 1968

3,407,126
ELECTRODEPOSITION OF MAGNETIC THIN FILMS

Herman Koretzky, Poughkeepsie, N.Y., assignor to International Business Machines Corporation, Armonk, N.Y., a corporation of New York Filed Dec. 23, 1965, Ser. No. 515,309
10 Claims. (Cl. 204—43)

This invention relates to magnetic thin films and, in particular, to an improved process for forming electrodeposited magnetic thin films of the type that find application in data processing and computer machines.

Within the relatively recent past, the computer industry has initiated concerted research and development efforts in order to implement the usage of magnetic thin films as storage and switching devices. The occurrence of magnetization reversal by the process of coherent spin rotation is probably the largest single factor that has captured the interest of the computer technologists, mainly because coherent spin rotation leads to rapid reversals in a potentially inexpensive medium. The introduction of anisotropy during fabrication provides at least two stable states corresponding to positive and negative remanent positions; storage and switching of intelligence is achieved by magnetizing a particular element or bit into one or the other of its stable states in a matrix of such elements. In addition to the availability of rapid magnetization reversals, less power is needed to operate a magnetic thin film than that required by the presently used magnetic computer components, and, the planar geometry of the film lends itself to printed circuit fabrication of the drive and sense lines, which circuits have transmission line properties that are most important at high frequencies.

The electrodeposition process offers a number of potentially unique advantages for the fabrication of magnetic thin films in comparison to other techniques, e.g., vacuum deposition, thermal decomposition, and cathode sputtering, such as: low equipment cost, short processing time, sensitivity to process control and regualtion, and adaptability to the production of large area films in large quantities. In the electrodeposition process, the metal constituents of the magnetic thin film alloy, which generally includes from about 65 to 85 percent by weight nickel, and 15 to 35 percent by weight iron, are maintained in the electrolyte as free ions or as complexes. The anions, most commonly accompanying the cations, in solution are the sulfates, chloride, sulfamates, acetates and hypophosphites. Both inorganic and organic additives are used, each of which can act as buffers; to enhance wetting, leveling, and brightening; or to reduce stress sensitivity.

Though many variables affect the magnetic properties of the electrodeposited thin film, of particular import is the composition of the resulting film. And, the relative concentrations of the depositable metal ions in the electrolyte is probably the most important single factor that determines the composition of the resulting film. Experience dictates that it is preferable, during the electrodeposition reaction, to drastically increase the concentration polarization of the system in order to effectively deposit the film under diffusion control. What effectuates concentration polarization is a change in the activity of the potential-determining constituents of the electrolyte: the passage of electric current through the system causes the metal ions near the cathode to neutralize and deposit on that surface; the loss of these metal ions alters the concentration of that cation in the immediate vicinity of the cathode which, in addition, experiences an excess of ligand near its surface. The excess ligand forms a barrier to diffusion of metal ions from the bulk of the solution. Ideally, a balance or a steady state is established in which the various metal ions are replaced at exactly the same rate in which they are removed, but in practice this is difficult to achieve and compositional variances are experienced. Therefore, it has been an object of considerable research to find a technique for overcoming these heretofore mentioned difficulties.

Accordingly it is a principal object of this invention to provide an improved process for electrodepositing a magnetic thin film.

It is another object of this invention to provide an electrodeposited magnetic thin film of the type finding application as a computer switching or storage device.

It is yet another object of this invention to provide an electrodeposition method, and, electrodeposited magnetic thin films produced by such method, which is characterized by superior magnetic properties for use as a computer element.

Now, what has been discovered is that the aforementioned objects are realized in accordance with the present invention by immersing a surface in a bath (electrolyte) that includes in addition to the required concentrations of metal ions, buffers, stress reducers, and wetting agents, a predetermined concentration of a thickening agent. The thickening agent decreases the mobility of the metal ions without impairing the mobility of the electrons, thereby resulting in a process having better compositional control and a much improved thin film of electrodeposit. Also, the process in accordance with the invention includes proper choice and regulation of the electrodeposition bath temperature, pH, and current density. Though thickening agents are known to the art, the general principles pertaining to their use offers little, if any, theoretical guidance, with any degree of certainty, to the electrochemist preparing a magnetic thin film. Since a unified theory or hypothesis embracing much of the empirical data presently available is wanting, the electrodeposition of thin films remains basically an empirical art, necessitating the definition of parameter controls required for each magnetic thin film system under investigation.

The foregoing and other objects, features and advantages of the invention will be apparent from the following more particular description of preferred embodiments of the invention as illustrated in the accompanying drawings.

Now, generally speaking, a substrate is immersed as the cathode in an electrolyte that contains in grams per liter: from about 40 to 115 nickel and preferably 59 nickel, as the nickel ion; from about 0.2 to 2 and preferably about 0.8 iron, as the ferrous ion; up to about 6 cobalt, and about 0.2 palladium, as the metal ions; about 15 to 45 boric acid, which is added to act as a buffer; about 0.2 to 1.0 saccharin to reduce stress sensitivity; up to about 0.4 sodium lauryl sulfate, which acts as a wetting agent. The ratio of the nickel ion concentration to the ferrous ion concentration is kept between 20:1 to 100:1 and preferably at about 74:1. A thickening agent, in a concentration of up to about 10 percent by weight per volume, is included in the electrolyte, such as a water-soluble copolymer of methyl vinyl ether and maleic anhydride, such as described in U.S. Patent 2,047,398 issued July 14, 1936 and Reissue Patent 23,514 issued June 24, 1952, or up to 5 percent by weight per volume of a hydroxy propyl carboxymethyl cellulose. Thickening agents in concentrations exceeding these amounts causes the electrolyte to gel and interference is encountered in the transport of the ions. The pH is maintained at 2.4 to 3.0 and preferably at 2.7, while the bath temperature is maintained at about 21° to 28° C. and preferably at 24° C. A voltage of about 0.9 to 1.2 volts and preferably about 1 volt is impressed between the cathode and anode with a current density of about 4 to 20 milliamperes per centimeter square and preferably at 8 milliamperes per centimeter square to initiate the electrodeposition reaction. The reaction takes from about 5 to 40 minutes to grow the desired magnetic thin film with a thickness between 800 to 30,000 A.; that electrochemical reaction proceeds in the bath under quiescent conditions, i.e., no agitation is required.

Figure 1:
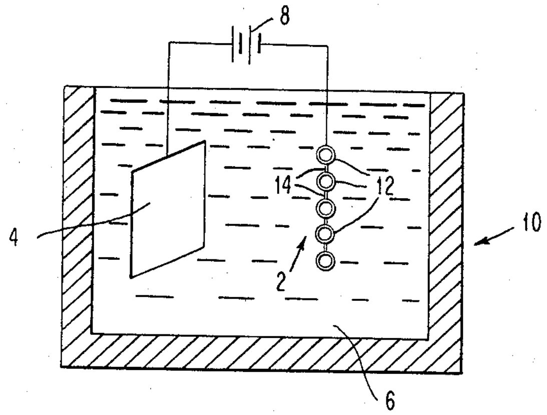
FIGURE 1 is a schematic illustration of the apparatus used in the electrodeposition of a magnetic thin film in accordance with the present invention.

Now, with reference to FIGURE 1 of the drawings, a more detailed description is presented. FIGURE 1 shows a plating cell 10 which includes beryllium-copper cathode 2 and inert anode of platinized tantalum 4 both of which are in spaced alignment in bath 6. Cathode 2 is coupled to the negative terminal of external EMF source 8, depicted as battery, while anode 4 is connected to the positive terminal of source 8. The cathode, as shown, is a conductive strip of beryllium-copper which includes a plurality of toroidal or elliptically shaped portions 12 that are in electrical contact by way of neck portions 14. The toroidal or elliptically shaped portions 12 form the storage or switching unit for the retention of intelligence. Of course it is to be recognized that although only a few storage units are shown as forming the cathode, it is to be understood that many such units may form part of the cathode during the electrodeposition process.

The cathode, which is the surface or substrate upon which the magnetic thin film is deposited, is preferably formed from two-ounce (0.0028 inch in thickness) rolled beryllium-copper. Such a substrate may typically have an over-all length of about 40 mils and the toroidal or elliptical portion an outer diameter of about 20 mils and an inner diameter of about 12 mils.

The surface condition of the substrate has a marked influence on the electrodeposit orientation. In fact, the direction of the easy magnetization (111) tends to orient itself parallel to the alignment of the surface defects. Forming the substrate by techniques such as rolling, drawing, and the like, tends to promote preferred directions for surface defects and the tendency for orientation of the electrodeposit in the direction of these surface defects is very strong, even the presence of external orienting fields that are placed about the plating cell 10. Thus, in order to control the direction of easy magnetization and obtain the desired magnetic properties in the resultant electrodeposit, procedures are called for in the pretreatment of the substrate that eliminate or substantially reduce the effect of the orienting defects.

This entails treating the substrate in aqueous solution of hydrochloric acid and cupic chloride (60 g./l. of $CuCl_2$ in 300 ml./l. of HCl) for about 30 seconds. The substrate is then placed in an electrolyte containing:

| | | |
|---|---|---|
| Phosphoric acid (density=1.71) | cc. | 1000 |
| $H_2O$ (de-mineralized) | cc. | 820 |
| Final density of solution | | 1.39 |

Cathode-stainless steel.

As indicated, the substrate acts as the anode during the electro-chemical reaction. A voltage of about 0.4 volt is impressed between cathode and anode for a period of about 2 minutes. The electro-chemical reaction covers the substrate surface with a red oxide film. The voltage is then gradually increased until about 2 volts for another 2.5 minutes. The substrate is then removed from the electrolyte and the red oxide stripped from the beryllium-copper substrate.

The substrate is then cleaned in a 10% solution of hydrochloric acid, rinsed with water, and then dried. Conventional photoresist is applied and the substrate is then exposed with positive art work to a xenon arc lamp, or equivalent light source, for a few seconds. The substrate is then etched in 30° Bé. ferric chloride, immersed in a photographic fixer and the desired substrate configuration developed according to standard techniques. The The substrate is then made the cathode in plating cell 10.

A suitable bath composition for the electroylte for depositing a magnetic thin film containing from 65 to 85 percent by weight nickel, 15 to 25 percent by weight iron, up to 10 percent by weight cobalt and up to 3 percent by weight palladium, characterized by superior magnetic properties as compared with prior art techniques, is exemplified by the following bath composition:

| Chemical | Formula | Grams per liter | | |
|---|---|---|---|---|
| | | Maximum | Preferred | Minimum |
| Nickel sulfate | $NiSO_4 \cdot 6H_2O$ | 320 | 260 | 200 |
| Ferrous sulfate | $FeSO_4 \cdot 7H_2O$ | 8 | 4 | 2 |
| Cobaltous sulfate | $CoSO_4 \cdot 7H_2O$ | | 4 | |
| Sodium palladium chloride | $Na_2PdCl_4$ | | 0.56 | |
| Boric acid | $H_3BO_3$ | 45 | 25 | 15 |
| Saccharin | $C_6H_4SO_2NHCO$ | 1.0 | 0.8 | 0.2 |
| Sodium lauryl sulfate | $CH_3(CH_2)_{10}COSO_4Na$ | | 0.4 | |
| Co-polymer of methyl vinyl ether and maleic anhydride | | | 100 | |
| $Ni^{++}/Fe^{++}$ | | 100:1 | 74:1 | 20:1 |

With the pH of the bath maintained at about 2.7, the electrodeposition reaction initiated with a voltage impressed between cathode and anode of about 950 millivolts with a current density of about 6 milliamperes per centimeter square, a magnetic thin film is obtained of about 20,000 A. thickness that contains the following constituents (in weight percent):

| | Percent |
|---|---|
| Nickel | 79 |
| Iron | 18 |
| Cobalt | 2 |
| Palladium | 1 |

Using a bath composition for the electrolyte, such as that given above, except that the thickening agent is replaced with hydroxypropyl carboxymethyl cellulose at a concentration of about 5 percent by weight per volume of electrolyte (50 grams per liter) yields similar results. The electrodeposition reaction was conducted for about 25 minutes and this also provided a magnetic thin film on the cathode having a thickness of about 20,000 A. A magnetic field of about 40 oersteds is applied in the direction of the longitudinal axis of the cathode 2 to induce a uniaxial anisotropy along that axis.

Figure 2:
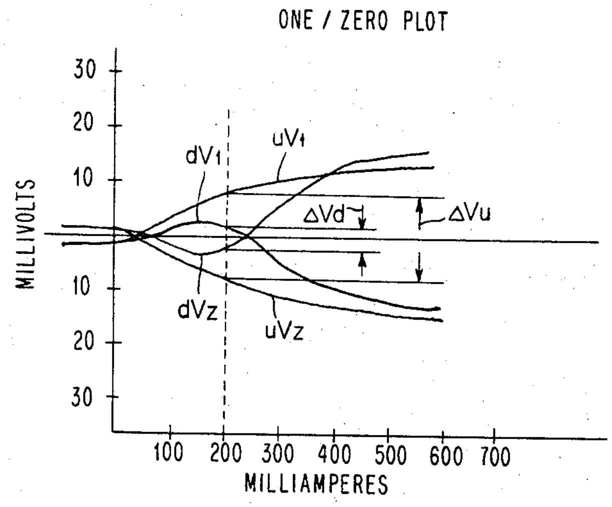
FIGURE 2 is a graphical illustration in the form of one/zero plots depicting the magnetic characteristics of an electrodeposited thin film formed without the addition of a thickening agent in the electrolyte.
Figure 3:
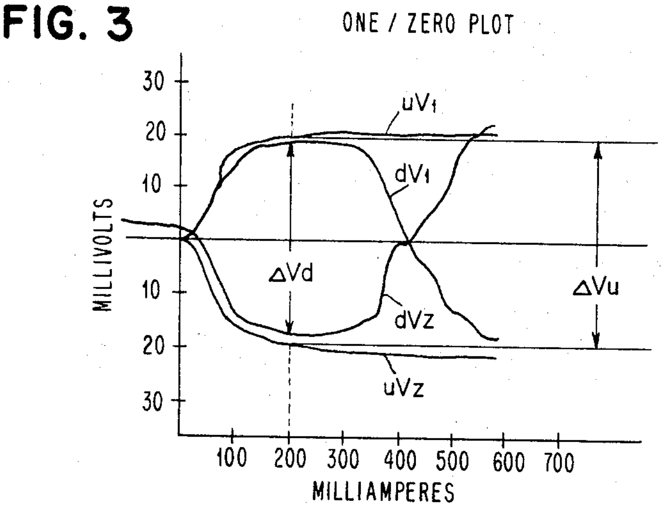
FIGURE 3 is a graphical illustration in the form of one/zero plots depicting the magnetic characteristics of a thin film formed in accordance with the present invention.

The superior magnetic properties derived by the practice of the present invention are illustrated by the one/zero plots of FIGURES 2 and 3 of the drawings. The plots depicted are for electrodeposited magnetic thin films formed in essentially the same electrolyte, and electrodeposited under essentially the same conditions, execpt that the electrolyte for the device of FIGURE 3 included a thickening agent, in accordance with the teachings of the present invention, whereas the electrolyte for the device of FIGURE 2 did not. An insight as to the behavior of these magnetic thin films operating as storage devices is gained from these curves. To obtain these graphs, the devices are operated in the orthogonal mode: a current pulse with a rise time of a few nanoseconds, with an amplitude of about 650 milliamperes, is passed through the longitudinal axis of the device (word pulse) to switch the magnetization of the film from the easy direction of magnetization into a direction at 90° from the easy direction (hard direction); applied concomitantly with that pulse but not simultaneously therewith, a second pulse, a bit pulse, is applied through a conductor passing through the cavity of the storage cells 12, which shifts the magnetization back into the easy direction. That pulse, the bit pulse, has a time lag of about 55 nanoseconds and has a varying amplitude increasing progressively from 0 to 600 milliamperes with a rise time at 30 nanoseconds. Reading is performed on the leading edge of the word pulse while writing is achieved when the word pulse and bit pulse overlap.

Now returning as to the details of plotting the curve, which provides a measure of the sensitivity of the magnetic thin films to disturb pulses, the 1 and 0 voltage signals are plotted against a bit pulse amplitude as depicted in FIGURES 2 and 3. The abscissa of the plots represents the range of bit pulses, while the ordinate represents the signal output in millivolts. To obtain the waveform for the undisturbed 1 signal ($uV_1$), the word pulse amplitude is maintained constant while the bit pulse amplitude is varied over the range given in the abscissa of the plots in FIGURES 2 and 3. A similar procedure is followed to obtain the waveform for the disturb 1 signal ($dV_1$) except now, after the bit pulse is applied, the stored information is disturbed by applying from 500 to 1000 bit pulses of the appropriate polarity with a rise time of 30 nanoseconds, but of an amplitude which is about 20% higher than that used in the plot of the undisturbed signal. The polarity of the bit pulse is reversed in plotting the undisturbed 0 ($uV_z$) and disturbed ($dV_z$). Other than that, the procedure is similar.

One/zero plots are sought that have large disturb 1($dV_1$) and large disturb 0($dV_z$) signals over a wide range of bit currents, particularly at the lower range of the bit currents; that have waveforms that rise rapidly from the origin of the graph; and, that have a cross-over point, designated $I_c$ on the plots, the point where the voltage signal decreases and crosses over the abscissa, that is maximized as far to the right from the origin as feasible. Point $I_c$ is of special interest for it is related by a constant factor to $H_c$, the coercive force, which is the field necessary to destroy the magnetization of the film in the easy direction, and beyond this point disturb pulses are sufficient to switch the magnetization direction of the film by 180° and eliminate the stored information. The disturb and undisturb signals should have essentially the same waveforms. Stating the latter point differently, in one/zero plots the ratio between the undisturb signal difference $\Delta V_u$ and disturb signal difference $\Delta V_d$ should approach unity $$(\Delta V_d/\Delta V_u=1)$$

That ratio is generally taken at the 200 milliampere coordinate along the abscissa, as brought out by FIGURES 2 and 3 of the drawing. With a device having plots satisfying these heretofore mentioned specifications, large signal differences are available over a wide range of bit currents, the necessity for maintaining strict uniformity in the individual elements comprising a large matrix of the same is reduced, and the propensity of the elements to lose information from accidentally applied stray fields or through the influence of adjacent fields, is decreased.

With this in mind, the discussion is now centered on a comparison of the one/zero plots of FIGURES 2 and 3. What is readily apparent is that the device of FIGURE 3 formed in accordance with the invention exhibits superior and improved properties over that available with the device for FIGURE 2. The leading edge of the waveform, representing the output signals, rises faster in FIGURE 3, thus enabling a more rapid response upon interrogation. The disturb signals ($dV_1$ and $dV_z$) more closely approximate the contour and curvature of the undisturb signals ($uV_1$ and $uV_z$) respectively. Or, expressed mathematically, the $\Delta V_d/\Delta V_u$ ratio at 200 milliamperes of bit current is closer to unity than that available for the device of FIGURE 2. Moreover, $I_c$, the cross-over point, relatively speaking, is much further to the right in FIGURE 3 than in FIGURE 2. As previously indicated, $I_c$ is related to $H_c$ and it is found that in the practice of the present invention, higher $H_c$ values are realized without an increase in $H_k$, the anisotropy field, that field required to rotate the information from the easy axis to the hard axis, an axis 90° from the easy axis. What is found in practice is that a device such as that of FIGURE 2 has an $H_c$ of approximately 1.2 oersteds while the device of FIGURE 3 has an $H_c$ value of approximately 2.2 oersteds with both devices having essentially the same value of anisotropy field, $H_k$, of approximately 4 oersteds.

What has been described is an electroplating process for producing magnetic thin films for storage applications on substrates of intricate geometry. A device produced in accordance with the present invention in contrast to one produced without the benefits thereof, has greater resistance to the influence of stray fields, a reduced sensitivity to disturb signals, and a large storage capacity which is accompanied by an increase in the device reliability.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of electrodepositing a magnetic thin film on a surface, comprising the steps of:

immersing the surface as a cathode in an aqueous electrolyte comprising from about 40 to 115 grams per liter of nickel as the nickel ion, from about 0.2 to 2 grams per liter of iron as the iron ion, up to about 6 grams per liter of cobalt as the cobalt ion, up to 0.2 grams per liter of palladium as the palladium ion, and an amount up to about 100 grams per liter of thickening agent;

maintaining the pH of said electrolyte in the range of about 2.4 to 3.0, and, impressing a voltage in said electrolyte between said cathode and a second electrode, the anode, to effectuate the electrodeposition of the magnetic thin film on said surface.

2. The method of claim 1 wherein said thickening agent is selected from the group consisting of a water-soluble copolymer of methyl vinyl ether and maleic anhydride and hydroxypropyl carboxymethyl cellulose.

3. The method of claim 2 wherein the ratio of said nickel ion concentration to said ferrous ion concentration in the electrolyte is maintained in the range between 20:1 to 100:1.

4. The method of claim 3 wherein said nickel ion concentration is at about 59 grams per liter, wherein said ferrous ion concentration is at about 0.8 gram per liter, wherein said electrolyte temperature is maintained in the range of about 21° C. to 28° C., and further wherein said voltage impressed between said cathode and the anode is in the range of about 0.9 to 1.2 volts.

5. The method of claim 4 wherein said voltage is maintained at about 1 volt.

6. The method of claim 1 wherein said thickening agent is selected from the group consisting of an amount up to 100 grams per liter of a water-soluble copolymer of methyl vinyl ether and maleic anhydride and an amount up to 50 grams per liter of a hydroxypropyl carboxymethyl cellulose, and further wherein said voltage impressed between said cathode and anode is about 0.9 to 1.2 volts.

7. The method of claim 6 wherein said electrolyte temperature is maintained in the range of about 21° C. to 28° C.

8. The method of claim 7 wherein the current density of said electrodeposition reaction is about 4 to 20 milliamperes per square centimeter at the cathode.

9. An aqueous electrolyte for use in the electrodeposition of a magnetic thin film on a surface comprising: from about 40 to 115 grams per liter of nickel as the nickel ion, from about 0.2 to 2 grams per liter of iron as the iron ion, up to about 6 grams per liter of cobalt as the cobalt ion, up to about 2 grams per liter of palladium as the palladium ion, an amount up to about 100 grams per liter of thickening agent, and sufficient buffer to maintain the pH of said electrolyte in the range of about 2.4 to 3.

10. The electrolyte of claim 9 wherein said thickening agent is selected from the group consisting of an amount up to 100 grams per liter of a water-soluble copolymer of methyl vinyl ether and maleic anhydride and an amount up to 50 grams per liter of an hydroxypropyl carboxymethyl cellulose.

References Cited

UNITED STATES PATENTS 3,272,727 9/1966 Schmeckenbecher _ 204—43 XR
3,297,418 1/1967 Firestone et al. ---- 204—43 XR HOWARD S. WILLIAMS, *Primary Examiner.*

G. KAPLAN, *Assistant Examiner.*